G. JOHNSTON.
NOSE REST FOR SPECTACLES.
APPLICATION FILED JUNE 27, 1912.

1,068,140.

Patented July 22, 1913.

WITNESSES:
Paul A. R. Kroesing, jr.
Virginia C. Spratt.

INVENTOR
George Johnston
BY
Raigemond A. Parker
ATTORNEY

COLUMBIA PLANOGRAPH CO., WASHINGTON, D. C.

UNITED STATES PATENT OFFICE.

GEORGE JOHNSTON, OF DETROIT, MICHIGAN.

NOSE-REST FOR SPECTACLES.

1,068,140. Specification of Letters Patent. Patented July 22, 1913.

Application filed June 27, 1912. Serial No. 706,132.

*To all whom it may concern:*

Be it known that I, GEORGE JOHNSTON, a citizen of the United States, residing at Detroit, county of Wayne, State of Michigan, have invented a certain new and useful Improvement in Nose-Rests for Spectatcles, and declare the following to be a full, clear, and exact description of the same, such as will enable others skilled in the art to which it pertains to make and use the same, reference being had to the accompanying drawings, which form a part of this specification.

This invention relates to spectacles and is provided with nose-rests so as to relieve the pressure on the bridge of the nose.

The invention is especially adapted for sensitive noses and the nose-rests are so constructed as to be capable of not only swinging movement, but also twisting movement about their own axes, so that each is capable of swinging movement in any plane that it may assume in its twisting movement.

Figure 1:
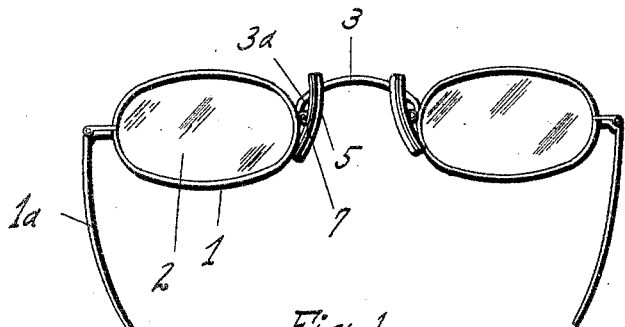
Figures 2, 3:
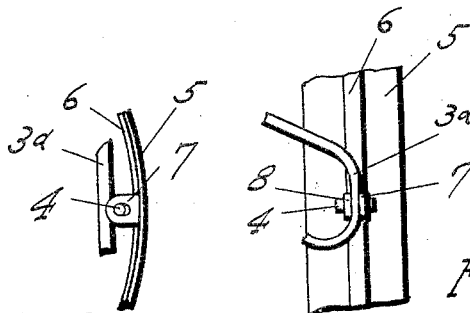
Figure 5:
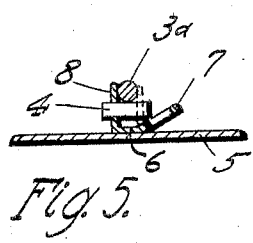
Figure 4:
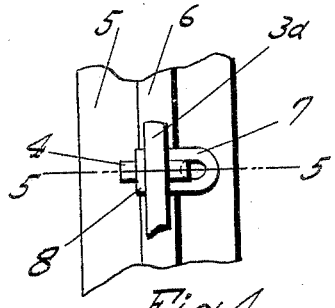

In the drawings:—Figure 1, is a rear elevation of a pair of spectacles. Fig. 2, is a detail of the nose-rest and part of the bridge of the spectacles. Fig. 3, is a detail of the part shown in Fig. 2, but viewed from the left in that figure. Fig. 4, is an enlarged detail of a portion of the bridge and a portion of the nose-rest, showing the way in which the perforated ears of the nose-rest are fastened to the pin that is attached to the bridge. Fig. 5, is a sectional detail taken on the line 5—5 of Fig. 4.

The spectacles comprise a pair of frames 1 and bows 1ª. In the frames the lenses 2 are fitted and these frames are joined by the bridge 3 which has a portion 3ª that loops to the rear of the plane in which the frames and the lenses lie. This bridge projects far enough forward of the plane of the lenses and frames so that it is adapted to nearly contact or approximately contact the surface of the nose and it is not intended to press the nose. On the portion 3ª that loops to the rear of the plane of the lenses, the pin or pivot 4 is soldered so that it projects at each side of the bridge, as shown in Fig. 3. The nose-rest has a facing 5 of celluloid or other suitable material. This is held by a small bar 6 to which it may be attached in any convenient way. This bar 6 is constructed so as to widen at the mid-portion forming a pair of ears 7 and 8. These ears are each perforated, the ear 8 with a circular perforation, this being the ear which will lie to the front when the nose-rest is fastened to the pin and the ear 7 is perforated with an elongated perforation or slot as is well indicated in Fig. 2.

Referring to Fig. 4, it will be seen that the ear 8 can be forced up, so that it is perpendicular to the facing 5 and so that the pin 4 may be slipped through the perforation. The ear 7 may then be bent up over the end of the pin, the elongated perforation or slot allowing this member to slip over the end of the pin obliquely, which would not be possible with a circular perforation of the same diameter as the diameter of the pin. This is my preferred form of construction, although the nose-rest may be stamped from one piece and the ears 7 and 8 bent up at the sides. Instead of having one ear perforated with a circular perforation and the other ear perforated with an elongated perforation, both ears may have elongated perforations. This, of course, would enlarge the range of twisting movement and give the rests a large range of adaptability to varying noses or different positions on the same nose.

It will be noticed that the pin 4 is soldered to the bridge portion 3ª. The ears 7 and 8 can be made so as to engage with the bridge portion 3ª, whereby the pin 4 cannot reach the extreme right (Fig. 2) of both slots at the same time and hence the nose rest cannot slide back and forth with respect to the bridge portion 3ª, but it will be obliged to rock about the bridge portion 3ª. The bridge portion 3ª thereby becomes a bearing upon which the twisting movement of the nose rest may take place.

It is my idea to combine a pair of nose-rests of peculiar construction to afford a maximum comfort with a pair of spectacles so as to afford a pair of glasses that are peculiarly adapted for sensitive noses.

I am aware that nose-grips are not new with bowed spectacles, but I believe the form of construction that I have described above is novel and peculiarly adaptable for the purpose in view, namely, to afford a very comfortable pair of glasses.

As already explained, the use of the slots running transversely of the axis of the rests allows a limited range of twisting movement, so that the surfaces of the rests may rest squarely on the surface of the nose without digging into the nose at certain points.

What I claim is:—

In a pair of glasses, the combination of a substantially round bridge portion, a pin soldered transversely of the bridge portion and a nose rest provided with a pair of ears having apertures, one of which is an elongated aperture, the said ears being adapted to be forced over the ends of the pin whereby the nose rest is capable of pivotal movement on the pin and also twisting movement about the round bridge portion, substantially as described.

In testimony whereof, I sign this specification in the presence of two witnesses.

GEORGE JOHNSTON.

Witnesses:
STUART C. BARNES,
VIRGINIA C. SPRATT.